UNITED STATES PATENT OFFICE.

REBECCA SHERWOOD, OF FORT EDWARD, NEW YORK.

IMPROVEMENT IN REDUCING STRAW AND OTHER FIBROUS SUBSTANCES FOR THE MANUFACTURE OF PAPER-PULP.

Specification forming part of Letters Patent No. 45,440, dated December 13, 1864.

*To all whom it may concern:*

Be it known that I, REBECCA SHERWOOD, of the town of Fort Edward, in the county of Washington and State of New York, have invented certain new and useful improvements in the process of reducing straw or other fibrous substances to a pulp, for the purpose of being manufactured into colored paper and colorless paper, commonly called "white paper," of which the following is a specification.

I use two tubs or pans holding about one thousand gallons each—for convenience about seven feet in diameter and four feet deep. I fill one with water nearly full, usually.

I use a wire or perforated basket two feet in diameter and two feet deep for a lime and potash slaker. Into this I put about two hundred and eighty-two pounds of quicklime at different times until the whole is slaked, in combination with sixteen pounds of potash, more or less. After the lime and potash are slaked together and united in the pan, then I usually add three hundred and eighty-two pounds of impure carbonate of soda, or soda-ash or its equivalent in a purer soda. I then usually heat it or boil it a short time—say from sixteen to sixty minutes—by steam or any other of the usual modes of heating or boiling. It is then ready for drawing off into the other pan or tub. I at times omit putting the soda or soda-ash into the pan with the potash and lime, and put it in the pan with the below-named ingredients. I then add about twenty pounds of grease or any other oleaginous or unctuous substance or substances, separate or combined, also about three or four pounds of borax or its equivalent in boron or boracic acid, or its equivalents. I then boil the whole together for about one hour. If I wish to use the solution settled, I let it stand a short time in the pan before drawing it into the other pan to receive the above-named ingredients. I sometimes omit the borax, boron, and boracic acid, or a part of them, according as I wish to produce a solution of a more soapy and alkali nature, and I also add more borax, boron, and boracic acid or their equivalents, when I wish to produce the soapy composition more acid-like in its composition.

I use, in addition to the tubs already described, a receiver or resorvoir which will stand in a position so as to receive the solution from either of the tubs, and in a position accessible so as to put in and combine all the ingredients hereinafter described.

If I wish to make my soap or soapy solution in the lower pan or reservoir independent of the other tubs, I may use an uncaustic or caustic soda or sal-soda, or a caustic or uncaustic potash, combined or separated, already manufactured in a solid or fluid state. I usually unite them in this lower pan or reservoir, and then unite the grease or greases or oleaginous or unctuous substances, with or without the borax, boron, or boracic acid, or their equivalents. I usually add water enough to these ingredients to make the number of gallons required for a boiler of straw or other fibrous substance, then unite them by heat sufficient to allow them to pass into the boiler in a heated state or in a greasy or soapy condition.

I do not confine myself to forming the above solution of the ingredients above described in the lower pan or reservoir; but if I choose to form the combination in the boiler I can do so.

I sometimes use a portion or the whole of the waste liquor drawn from a previous boiling, after purifying it by any suitable process or treatment by a hydrate of lime or a hydrated solution of lime, or any other process to cleanse it of its coloring-matter, according to the quality of the pulp I wish to make.

For each boiler or vessel being filled with from nineteen hundred to twenty hundred pounds of straw or other fibrous substance, I usually add about fifteen hundred and seventy-five gallons of either of the soapy solutions as above described. The time for reducing its contents may vary from three to five hours after the heat, gases, and steam have raised the pressure in the boiler to from eighty to one hundred or one hundred and fifteen pounds to the inch.

I frequently prepare my straw with a hydrated-lime solution, after boiling it for an hour or two in water and then drawing it off. I slacken about four barrels of lime in about fifteen hundred gallons of water. I sometimes add twenty-five pounds of salt, or more, as I may wish to minerally acidulate the solution. When I slaken the lime in the tub I boil it a short time after it is slakened, and then let it settle, and draw it into the boiler in which I wish to boil the straw or other fibrous substances. I then boil it from three to five hours, according to the pressure of heat and steam I may get on. I then draw the liquor from the boiler, leaving the straw softened and well cleansed of a greater portion of its coloring-matter. I then add either of the soapy solutions, as above described, as it does not then require as strong a soapy solution to reduce the straw or other fibrous substances to a pulp—say from one-eighth to one-third less strength of the solution, according to the quality of the pulp I may wish to produce. I usually add the hydrated solution into the boiler by means of a force-pump without letting off the steam. I also pass the soapy solution in the same way into the boiler. I then finish the boiling in about three to five hours after the steam and gases raise the pressure on the steam-gage to about ninety-five pounds and upward.

I do not confine myself to uniting the ingredients in the exact manner described, but vary them according to circumstances—namely, if I wish to make a boiling quicker, and pulp of a more even or fine quality, I add more of the impure carbonate of soda or soda-ash, and instead of using three hundred and eighty-two pounds I use four hundred and five pounds or more. When I wish to make a coarser quality of pulp I use less than three hundred and eighty-two pounds of impure carbonate of soda or soda-ash for each boiler full of straw or other fibrous substances, together with the solution above described; nor do I confine myself to the same quantity of liquor, but vary it according to circumstances. I also vary in like manner the quantity of grease or other oleaginous substance, and also the quantity of lime to about from two hundred to two hundred and fifty pounds, as thought desirable.

I usually, after filling the pan or boiler with straw or other fibrous substances, and adding the solution thereto, raise the heat until the steam and gases raise the pressure in the boiler from ninety to one hundred and fifteen pounds to the inch, more or less, as may be thought best suited to the strength of the soapy solution and length of time you may wish to have it boil; but in some instances it may be more than one hundred and fifteen pounds and in others less than ninety, for the same reason. This process may be accomplished in any of the boilers now in use.

What I claim as my invention, and desire to secure by Letters Patent, is—

1. The use or uses of the soapy solution prepared as herein described, in combination with any ingredient or ingredients which will combine with either, in a heated state in a solution, and reduce straw or any other fibrous substance to a pulp for the purpose of being converted into colored or colorless paper, commonly known as "white paper."

2. The use or uses of the above-named different and described soapy solutions for reducing straw or other fibrous substances to a pulp previous to and for the purpose of being used or manufactured into colored or white paper.

3. The use of combining a portion of the residuum or waste liquid drawn off from a previous boiling (treated or not as previously described) with a sufficient portion of a new soapy solution, as previously described, for a new boiling of straw or other fibrous substance.

REBECCA SHERWOOD.

Witnesses:
J. K. PIXLEY,
HENRY TEFFT.